(12) United States Patent
Agami et al.

(10) Patent No.: US 7,490,510 B2
(45) Date of Patent: Feb. 17, 2009

(54) MULTI-FUNCTION AIR DATA SENSOR

(75) Inventors: Mark Agami, Reading, MA (US); Chiz Chikwendu, Randolph, MA (US); William Michael Glasheen, Derry, NH (US); John Wolbach, Lansdale, PA (US)

(73) Assignee: Ametek, Inc., Paoli, PA (US)

( * ) Notice: Subject to any disclaimer, the term of this patent is extended or adjusted under 35 U.S.C. 154(b) by 12 days.

(21) Appl. No.: 11/552,018

(22) Filed: Oct. 23, 2006

(65) Prior Publication Data

US 2007/0107510 A1 May 17, 2007

Related U.S. Application Data

(60) Provisional application No. 60/729,842, filed on Oct. 24, 2005.

(51) Int. Cl.
*G01C 21/00* (2006.01)
(52) U.S. Cl. ..................... 73/170.02; 73/182
(58) Field of Classification Search ............ 73/182, 73/170.02
See application file for complete search history.

(56) References Cited

U.S. PATENT DOCUMENTS

| | | | |
|---|---|---|---|
| 3,940,622 A * | 2/1976 | Stallabrass et al. ....... 250/338.1 |
| 4,851,817 A * | 7/1989 | Brossia et al. ............. 340/583 |
| 5,241,866 A * | 9/1993 | Rossow .................... 73/861.66 |
| 5,466,067 A | 11/1995 | Hagen et al. ............... 374/138 |
| 5,610,845 A * | 3/1997 | Slabinski et al. ............ 702/144 |
| 5,628,565 A | 5/1997 | Hagen et al. ............... 374/143 |
| 5,695,155 A * | 12/1997 | Macdonald et al. ...... 244/134 F |
| 5,731,507 A | 3/1998 | Hagen et al. ............... 73/182 |
| 6,002,972 A | 12/1999 | Palmer ......................... 701/4 |
| 6,320,511 B1 * | 11/2001 | Cronin et al. ............... 340/580 |
| 6,430,996 B1 * | 8/2002 | Anderson et al. ......... 73/170.26 |
| 6,543,298 B2 * | 4/2003 | Cronin et al. ............. 73/861.65 |
| 6,672,152 B2 | 1/2004 | Rouse et al. .............. 73/170.02 |
| 6,940,425 B2 | 9/2005 | Frantz ........................ 340/963 |
| 2002/0122001 A1 * | 9/2002 | Bachinski et al. ......... 342/357.06 |
| 2002/0162401 A1 * | 11/2002 | Bachinski et al. ......... 73/861.65 |
| 2003/0010109 A1 * | 1/2003 | Cronin et al. ............. 73/170.12 |
| 2004/0122615 A1 * | 6/2004 | Cronin et al. ............... 702/138 |
| 2004/0261518 A1 * | 12/2004 | Seidel et al. ................. 73/182 |
| 2006/0155506 A1 * | 7/2006 | Cronin et al. ............... 702/138 |
| 2006/0212181 A1 * | 9/2006 | Cronin et al. ................. 701/3 |
| 2008/0047338 A1 * | 2/2008 | DuPuis .................... 73/170.02 |

* cited by examiner

*Primary Examiner*—Andre J Allen
(74) *Attorney, Agent, or Firm*—Hayes Soloway P.C.

(57) ABSTRACT

An air data sensor that determines a body's angle of attack, static air pressure, total air pressure, mach number, static air temperature and true air speed in one device using pressure and temperature readings. The air data sensor includes a probe that protrudes into an airflow to collect data, a base plate for attaching the probe to a body, and an electronics housing including electronics for interpreting the data collected from the probe.

26 Claims, 10 Drawing Sheets

Section E-E

Section D-D

MULTI-FUNCTION AIR DATA SENSOR

The following application claims priority to provisional application Ser. No. 60/729,842 filed on Oct. 24, 2005.

TECHNICAL FIELD

The present invention generally relates to air data sensors. More particularly, the present invention is an improved multifunction air data sensor that has an improved shape, is easier to manufacture, and provides for the efficient conversion of the measurements to outputs with only three pressure transducers.

BACKGROUND OF THE INVENTION

Air data sensors are typically mounted to an aircraft and are capable of measuring the movement of fluids relative to the same. Depending upon the application, various air data sensors may take several measurements, including total air pressure (also called Pitot pressure), static air pressure, total air temperature, static air temperature, angle of attack, and angle of slip. In general, smaller manually flown aircraft require fewer of these measurements e.g., only static air pressure and total air pressure, while larger aircraft, that operate under more regulation and have more automation, may require the complete set of measurements.

Air data sensors may comprise various probes and transducers that supply signals to a computer box or integrated computer box/display device to calculate the speed, direction, altitude and other aerodynamic information required to pilot an aircraft. A Pitot-static probe, shown in FIG. 1, is typically used to measure the total and static pressure. This probe has ports connected to pressure transducers to effectuate these measurements. The total air temperature is usually measured with a ported probe, shown in FIG. 2. A ported probe is similar in concept to a Pitot tube, but the port leads to a temperature transducer instead of a pressure transducer and ported probes normally employ exit ports to reduce the response time of the instrument. Static air temperature is normally measured using an opening leading to a transducer instead of an external probe since this measurement is largely uninfluenced by air velocity. An angle of attack (AOA) probe measures the angle the aircraft is moving relative to the air stream. One style of angle of attack probe, shown in FIG. 3, employs a rotating fin or blade that aligns itself with the air stream and outputs a signal proportional to the angle of rotation. An angle of slip probe is similar to the angle of attack probe, but the fin or blade is mounted pointing up or down instead of right or left.

Dual function probes such as the Pitot probe, which measures both static and total pressure, are known in the art. See, for example, U.S. Pat. No. 6,002,972 which discloses an airplane wing fitted with orifices in order to take pressure measurements at two locations along the surface of the wing. See also, U.S. Pat. Nos. 5,731,507 and 5,628,565 that disclose dual function sensors that take both pressure and temperature measurements.

However, prior to the present invention, no one was able to integrate pressure, temperature, and angle of attack probes and transducers in a single, compact and robust assembly. Accordingly most prior art applications required the use of multiple analog sensors. Not only must all of these sensors be integrated into the aircraft instrumentation, thereby increasing production costs, employing multiple sensors also place additional protrusions on the aircraft's fuselage, increasing the total drag force on the aircraft and reducing its effective flying range.

Thus, there is a need for an improved multifunction air data sensor in which all probes and transducers are integrated in a single compact, robust assembly that either communicates with the air data system computer digitally or replaces the air data system computer entirely, thereby reducing the weight and the cost of an airplane's instrumentation.

BRIEF SUMMARY OF THE INVENTION

One or more of the embodiments of the present invention provide an air data sensor that measures the static air pressure (SAP), total air pressure (TAP), total air temperature (TAT), and the aircraft's angle of attack (AOA). From these measurements, additional parameters such as Mach number, air speed, and pressure altitude can be determined. There are no moving parts as the sensor utilizes the variation in pressure along the probe surface to calculate the AOA. SAP and TAP are determined by comparing measured pressures to expected values given the probe's shape. The air data sensor assembly further includes the transducers and means for processing analog processor output.

BRIEF DESCRIPTION OF THE DRAWINGS

FIG. 4a is a longitudinal cross-sectional view of a rounded tip portion of the data probe according to the embodiment of FIG. 4;

FIG. 4b is a cross-sectional view of the data probe along the D-D axis of FIG. 4a;

FIG. 4c is a cross-sectional view of the data probe along the E-E axis of FIG. 4a;

DETAILED DESCRIPTION OF THE INVENTION

Figure 1:
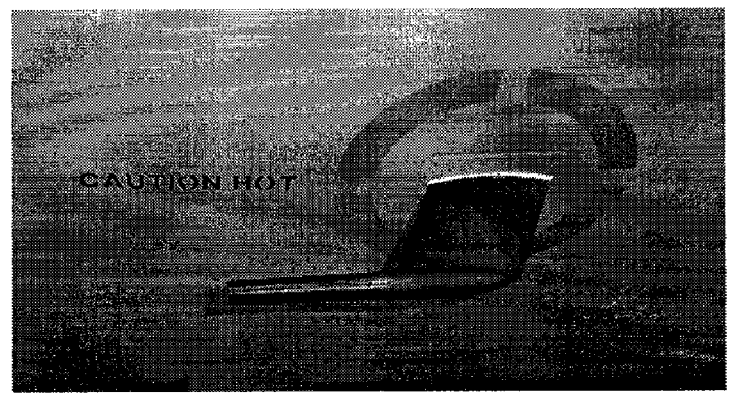
FIG. 1 illustrates a prior art pitot probe.
Figure 2:
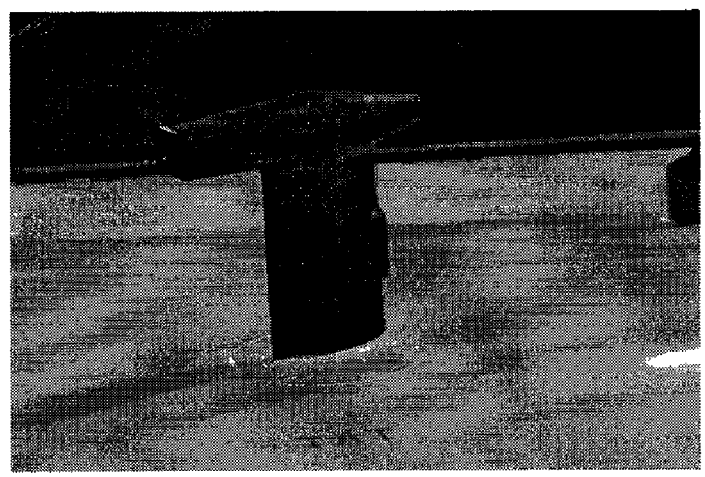
FIG. 2 illustrates a prior art ported probe.
Figure 3:
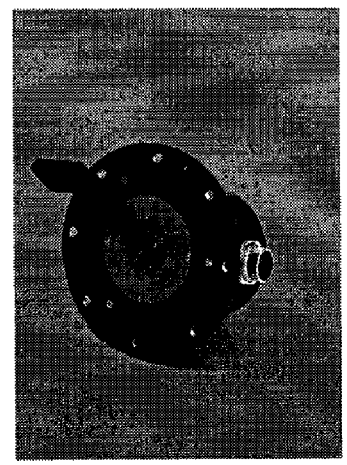
FIG. 3 illustrates a prior art angle of attack probe.

While this invention is susceptible to embodiments in many different forms, there is shown in the drawings and will be described herein in detail, a preferred embodiment of the invention with the understanding that the present disclosure is to be considered as an exemplification of the principles of the invention and is not intended to limit the broad aspects of the invention to the embodiment illustrated.

Figure 4:
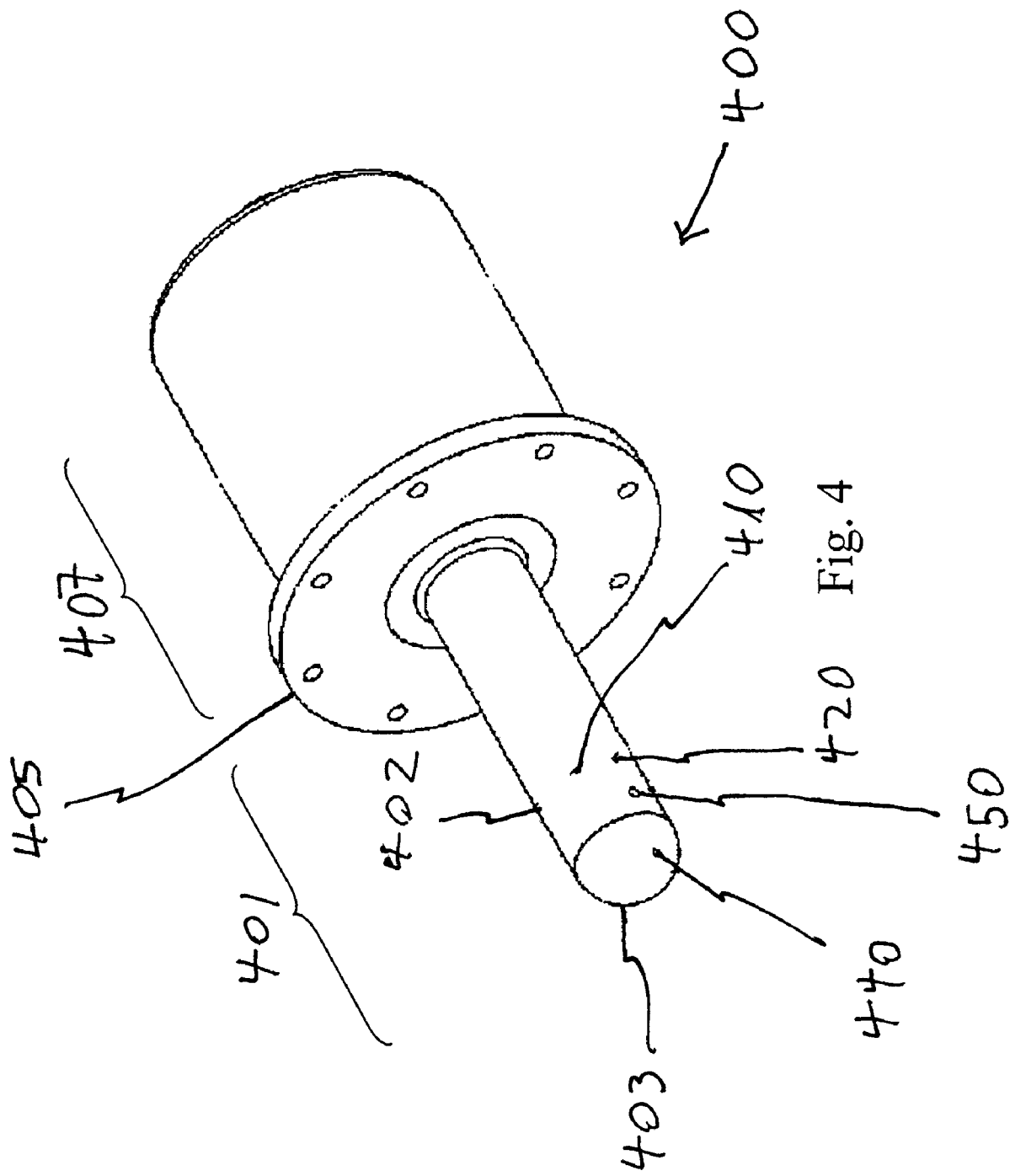
FIG. 4 is a perspective view of a data probe according to one embodiment of the present invention.
Figure 4:
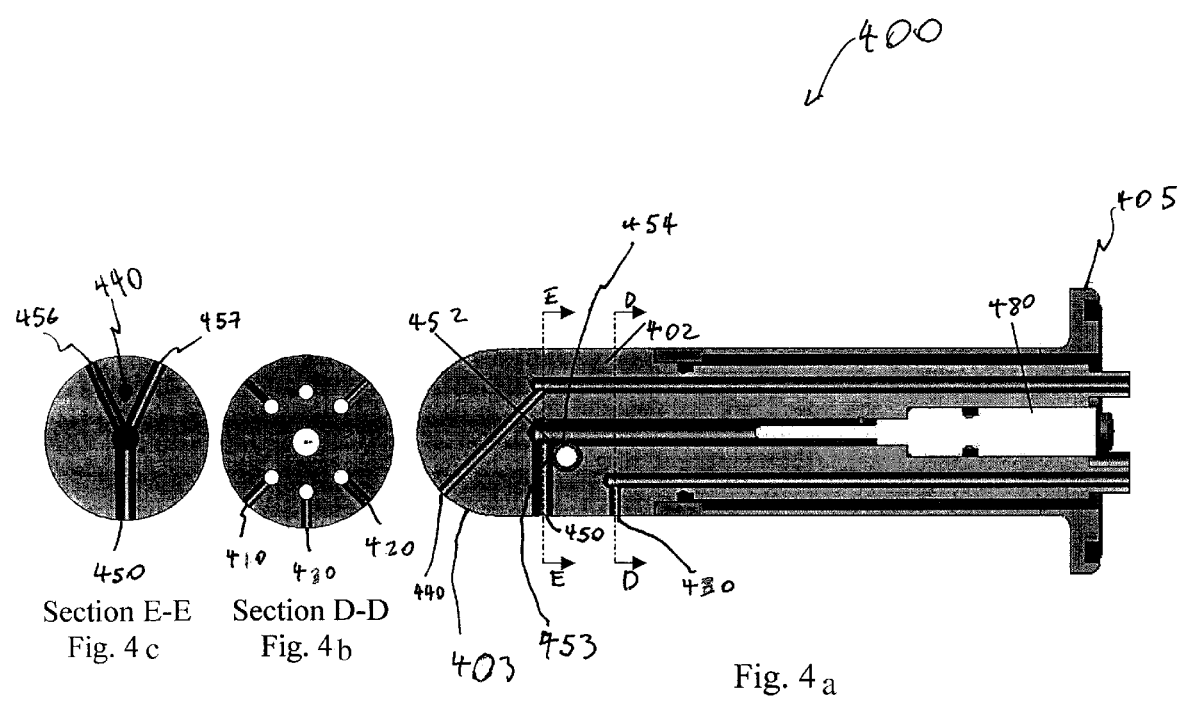

FIG. 4 illustrates a multifunction data sensor 400 according to an embodiment of the present invention. The data sensor 400 includes a probe 401 that protrudes into the airflow to collect data, a base plate 405 for attaching the probe to e.g., the fuselage of a plane, and an electronics housing 407 including electronics (not shown) for interpreting the data collected from probe 401.

The probe 401 will be described in detail with reference to FIGS. 4, 4a, 4b, 4c and 4d. The probe 401 includes a long portion 402 and a tip 403. Long portion 402 may be cylindrical and tip 403 may be rounded, although multiple different shapes for the long portion and tip including, but not limited to, rectangular, square, pentagonal, hexagonal, etc. may be employed. However, a cylindrical long portion 402 and a rounded tip 403 is advantageous in the collection of data because it exposes the same planar cross section to the airflow, regardless of a plane's angle of attack, thereby eliminating deviations in pressure due to a drag force that varies with the same.

Arranged in the long portion 402 are several passageways, namely a first surface pressure passageway 410, a second surface pressure passageway 420, a third pressure passageway 430 and a temperature passageway 450. A tip surface pressure passageway 440 is arranged on the rounded tip 403, preferably at a 45-degree angle from the long axis of long portion 402.

Additionally, a detector 480 that measures temperature, e.g., a resistance temperature detector (RTD), is arranged inside the temperature passageway 450 in the long portion 402. In operation, air enters temperature passageway 450 and impinges upon detector 480, which is in turn connected to electronics on boards 487 inside housing 407. Outlets 458 and 459 exhaust air after it impinges upon resistance temperature detector 480. And, a right angle in passageway 450 directs only air to the resistance temperature detector 480, while outlets 456 and 457 allow most of the air and particulates to pass through without striking and damaging the resistance temperature detector 480. An additional passageway is provided normal to the cross section shown in FIG. 4a at location 452/453/454 to enhance the airflow's ability to turn the corner and minimize turbulent mixing. That this passageway reduces the boundary layer thickness of the air stream and results in lower heating errors.

Figure 4D:
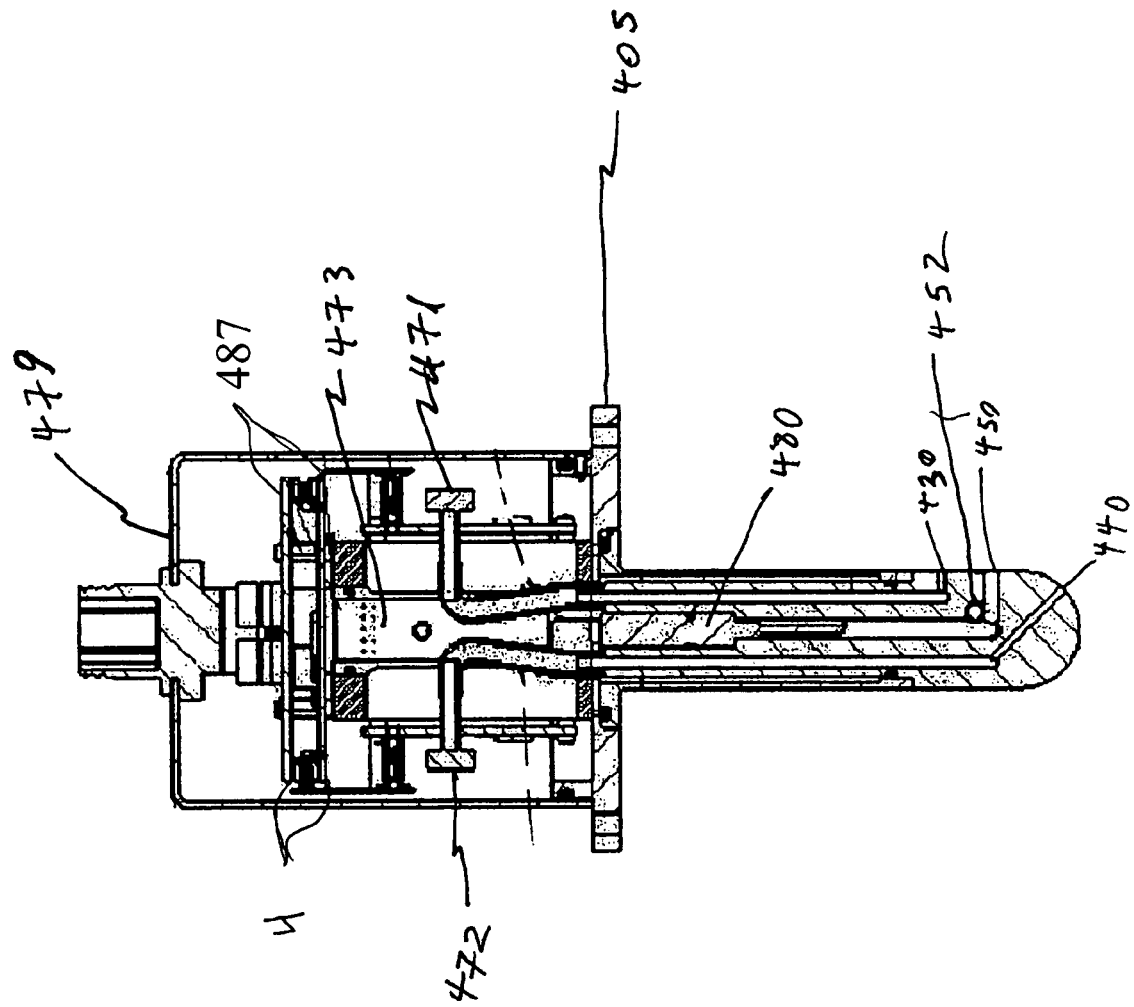
FIG. 4d is a cross-sectional view along the longitudinal axis of the data probe according to the embodiment of FIG. 4.

The housing 407 will now be described in detail with reference to FIG. 4d. Housing 407 includes a differential pressure sensor 473, a first absolute pressure transducer 471 and a second absolute pressure sensor 472, and electronics (not shown) located on boards 487. Pressure passageways 410 and 420 are pneumatically connected to differential pressure transducer 473. Pressure passageway 430 is pneumatically connected to a first absolute pressure transducer 471, and pressure passageway 440 is pneumatically connected to a second absolute pressure transducer 472. Each of the differential pressure sensor 473, a first absolute pressure transducer 471, a second absolute pressure sensor 472 and the temperature detector 480 are coupled to electronics (not shown) located on boards 487.

Figure 5:
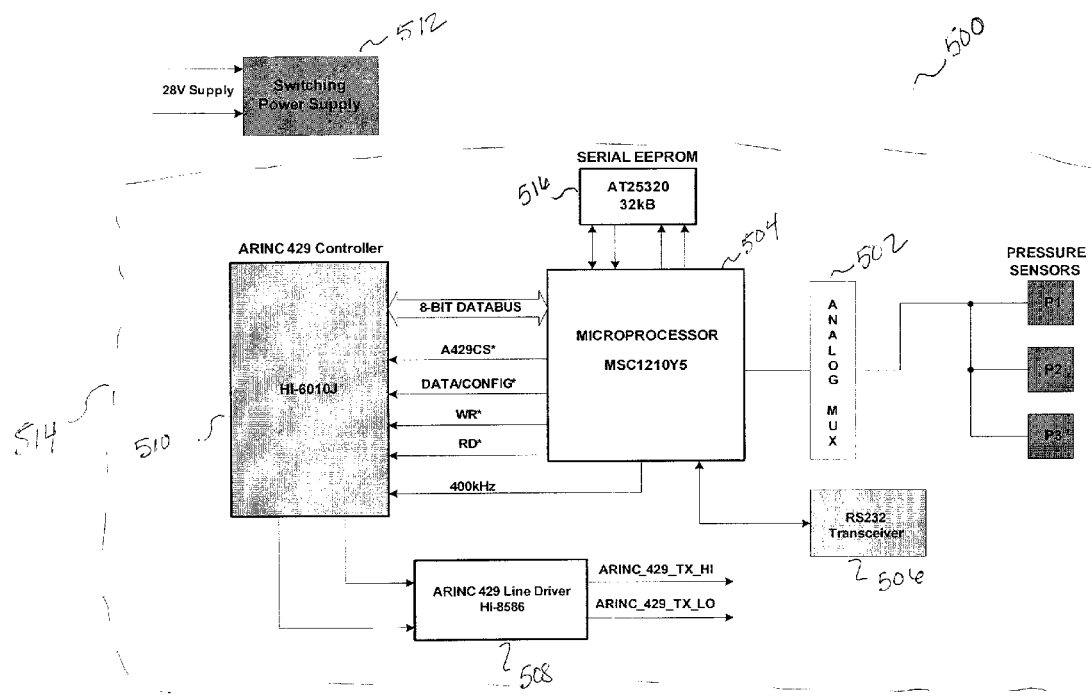
FIG. 5 is a block diagram of the electronics according to an embodiment of the invention.

The electronics 500 will now be described in more detail with reference to FIGS. 4d and 5. The electronics 500 include two printed circuit boards 487, namely a power board 512 and a processor board 514. However, it also is possible to locate the pressure transducers, processor and power electronics on a single circuit board or two or more boards, depending upon the application.

The power board 512 uses aircraft generated voltage, for example, 28V DC, and provides regulated DC outputs for the air data sensor electronics, including the on-board pressure sensors. In addition to generating voltage outputs for the electronics, the power board ideally incorporates protective features such as reverse voltage protection, over-voltage protection, surge voltage protection and under voltage lock out, to protect the downstream air data sensor electronics from damage. The power board also ideally provides a hold up capability up to 50 ms, to prevent the sensor from shutting down during power interrupts of duration shorter than 50 ms. However, one or more of these protective features could be eliminated without departing from the spirit and scope of the invention.

The processor board 514 incorporates an analog multiplexer 502, a microprocessor 504, a transceiver 506 (e.g., a ARINC 429 transceiver), a non-volatile memory (e.g., an EEPROM), and a line driver (e.g., a RS 232 line driver).

Microprocessor 504 is, for example, an 8-bit 8051 based processor with inbuilt 32 kB Flash memory. This inbuilt flash is capable of being partitioned into user and program memory. This exemplary microprocessor is capable of addressing up to 64 KB of external RAM, with on-board 24-bit sigma delta analog to digital converter (ADC), pulse width modulated (PWM) output, serial peripheral interface (SPI) and dual universal asynchronous receiver/transmitter (UART). In addition, this exemplary microprocessor is capable of performing floating-point operations on the order of microseconds. Although all of the features above are preferably on microprocessor 504, other processors could be substituted with or without some of these features.

Figure 6:
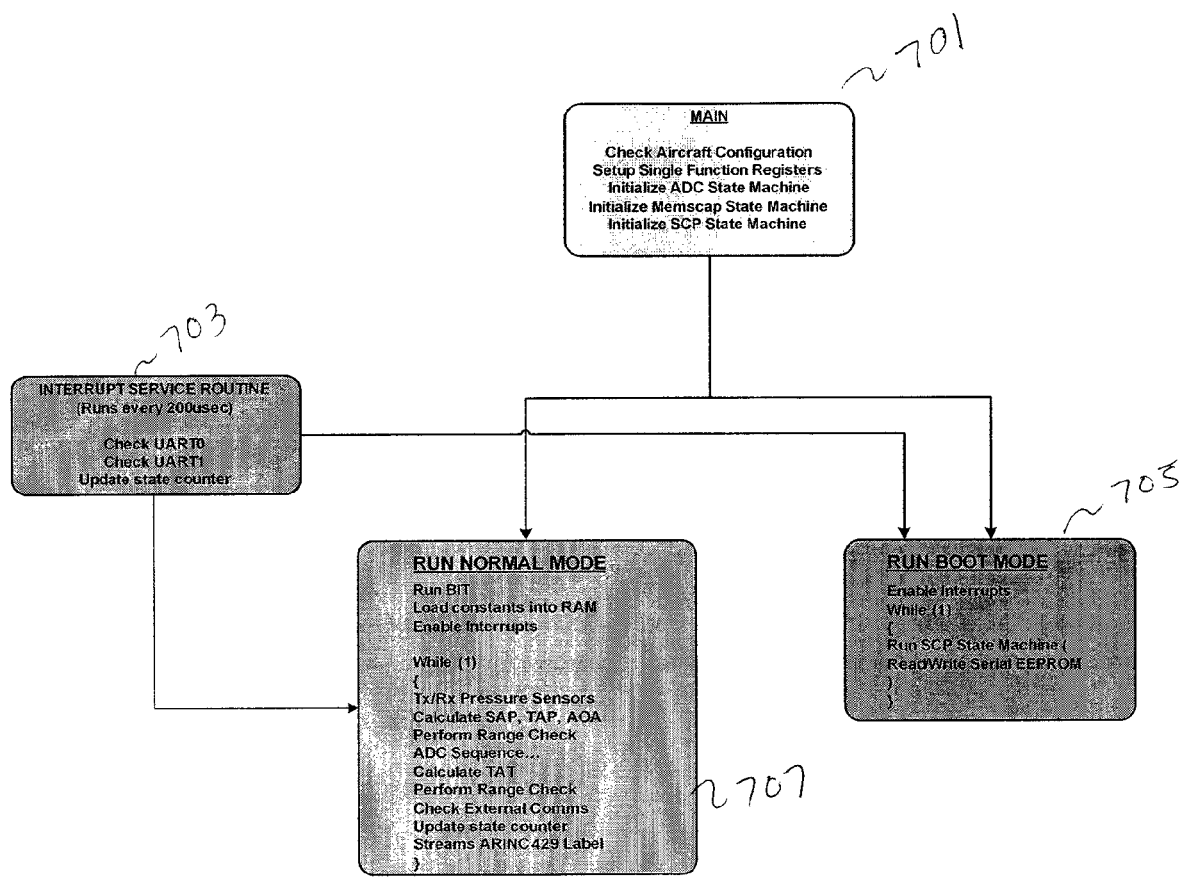
FIG. 6 is a block diagram of the software according to an embodiment of the invention.

The operation of the air data sensor will be described in detail with reference to FIGS. 4d, 5 and 6. In operation, air traveling into the first surface pressure passageway 410 and air traveling into the second surface pressure passageway 420 flows to the differential pressure sensor 473, where the difference in pressure between the first and second surface pressure passageways is converted to an electrical signal and output to the electronics 500 as P1. Similarly, air enters the third surface pressure passageway 430 and flows to the surface absolute pressure transducer 471, where the absolute pressure in this passageway is measured, converted to an electrical signal and output to the electronics 500 as P2. And, air entering tip surface pressure passageway 440 flows to surface absolute pressure transducer 472 where the absolute pressure in this passageway is measured, converted to an electrical signal and output to the electronics 500 as P3.

P1, P2 and P3 are input through an analog switch, where the data from the pressure sensors is converted to an RS232 digital data signal. The microprocessor 504 converts the received digital data to floating point notation for data processing. The onboard ADC of the microprocessor 504 also receives the output from the temperature detector 480. Microprocessor 504 processes all of this data in accordance with software stored in processor memory, said software being discussed in more detail below. Microprocessor 504 then outputs data through the ARINC 429 transceiver 506 to meet the ARINC 429 protocol requirements.

Serial EEPROM 516 is connected to the Microprocessor 504, and enables constants stored in software on the microprocessor 504 to be modified to take into account variables such as aircraft model, etc. The RS 232 transceiver is similarly connected to the microprocessor 504 and is used to query data in the various memory locations.

The software stored on microprocessor 504 will now be discussed in more detail with reference to FIG. 6. In general, P1, P2, P3 and temperature data are processed by the software stored in microcontroller 504 to output the angle of attack, static air pressure, total air pressure, total air temperature, and Mach number. The software accordingly: excites the temperature detector 480, acquires analog data corresponding to temperature via the temperature detector 480, calculates the total air temperature in degrees C using the digital temperature data, obtains pressure readings using digital communication via the microprocessor 504's UART port with the on-board pressure sensors, converts the uncorrected pressure readings to IEEE 754 floating point notation, calculates angle of attack using calculated AOA provide corrected pressure readings in millibars, calculates the MACH speed using the calculated static pressure and total pressure readings, outputs signals in the appropriate format, e.g., ARINC 429, corresponding to angle of attack, total air temperature, static air pressure and total air pressure, provides the ability to null out the zero angle of attack position for each aircraft, performs Built-In Test (BIT) diagnostics, provides two discrete input interfaces (aircraft configuration discretes) thereby allowing for left/right side aircraft installation, provides a discrete input interface to determine sensor mod (this discrete is used in conjunction with the aircraft configuration discretes), and makes use of an EEPROM to store modifiable constants necessary to perform calculations on measured parameters.

The software stored on microprocessor 504 has two modes of operation; "normal mode" and "EEPROM mode". The primary difference is that during normal mode, the sensor functions as expected on the aircraft. The purpose of the EEPROM mode is to provide a safe way of modifying the constants used to perform calculations. Some of these constants may depend on the particular aircraft, and accordingly need to be modifiable. The microprocessor incorporates a hardware discrete signal called "changemode". Depending upon the state of this signal on power-up, the processor will either separate in normal mode or EEPROM mode. When operating in EEPROM mode, the processor allows the user to modify the contents of the EEPROM.

There are four software modules that perform the above functions: the main module 701, the Interrupt service routine module 703, the run boot mode module 705, and the run normal node module 707.

Main module 701, checks the aircraft configuration, i.e., left/right, and initializes the system, specifically the single function registers, ADC state machine, pressure transducer state machine and the SCP state machine. Main module 701 is connected to both the Run normal module 707 and the run boot mode module 705. Run normal module 707 receives information from the pressure sensors and the temperature detector and calculates the SAP, TAP, AOA and TAT and outputs data to the controller 510. Run boot mode module 705 only allows a user to modify contents of EEPROM. The microprocessor 504 performs no other functions. Data constants are read onto memory at start up from EEPROM. Interrupt service module 703 is connected to run normal module 707 and run boot mode module 705. Interrupt service module runs every 200 usec. At every 200 us interval, the interrupt service routine checks the UART ports for any data to be transmitted or received.

The method the run normal module 707 employs to calculate the SAP, TAP, AOA and TAT will now be discussed.

The first parameter calculated by module 707 is the angle of attack. The angle of attack AOA is virtually linearly proportional to a ratio between pressure differentials such that $$AOA \propto \frac{P_{410} - P_{420}}{P_{430} - P_{440}}.$$

Next, the static air pressure (SAP) and total air pressure (TAP) are calculated from the pressure measurements knowing that the geometrical relationship between the ports is unchanged as the angle of attack varies. This can be analogous to "triangulation" of one's position via three beacons knowing the relative location of the three beacons.

Mathematically, the static and total pressures are calculated as follows. The pressure coefficient, well known to those skilled in the art, is a dimensionless number that represents the pressure at a point on a surface relative to a dynamic pressure. For a pressure p, the pressure coefficient $c_p$ is defined as:

$$c_p = \frac{p - SAP}{TAP - SAP}$$

This dimensionless expression is useful because the pressure at a point on a surface of an object, $c_p$, is in a form that is independent of air density and velocity.

Figure 7:
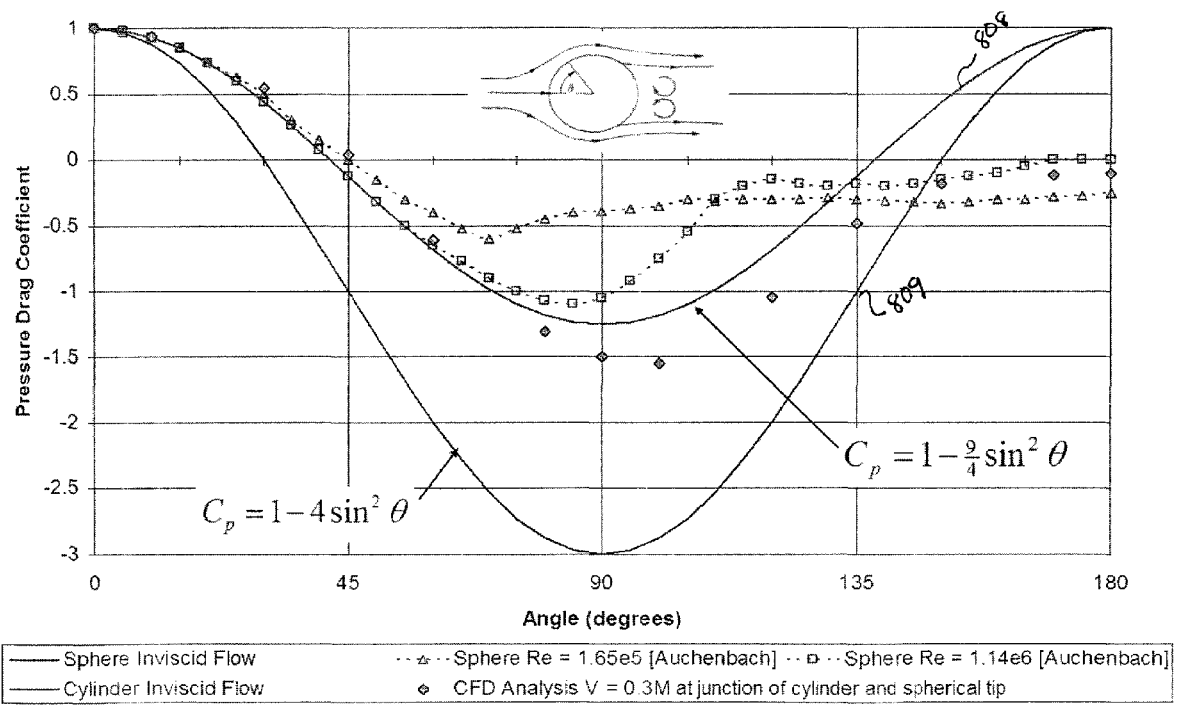
FIG. 7 is a pressure distribution curve for the circular cross-sections of the air probe of the instant invention.

The non-connected grey diamonds in FIG 7 show the pressure coefficients for the non-rotating cylinder and sphere of the exemplary embodiment of the instant invention. Note that at the front point of the cylinder, where θ=0°, the pressure coefficient is equal to unity and the pressure p equals the total air pressure. The plot of the results of the above for a sphere is show by 808, and for a cylinder as 809. As can be seen, the pressure variation at the end of a long cylinder with a spherical tip has a pressure distribution much like a sphere rather than a cylinder.

For the frontal portion of a sphere and cylinder, the pressure coefficient as a function of angular location is closely approximated by the inviscid (frictionless) solutions:

$$\text{Cylinder:} \quad c_p = 1 - 4\sin^2\theta$$

$$\text{Sphere:} \quad c_p = 1 - \frac{9}{4}\sin^2\theta$$

The pressure coefficient on the front portion of a sphere can be generalized further into a more convenient form such that it is expressed in terms of two angles, pitch and yaw:

$$\text{Sphere:} \quad c_p = 1 - \frac{9}{4}(1 - \cos^2\alpha\cos^2\phi)$$

where α=pitch angle
φ=yaw angle

Figure 8:
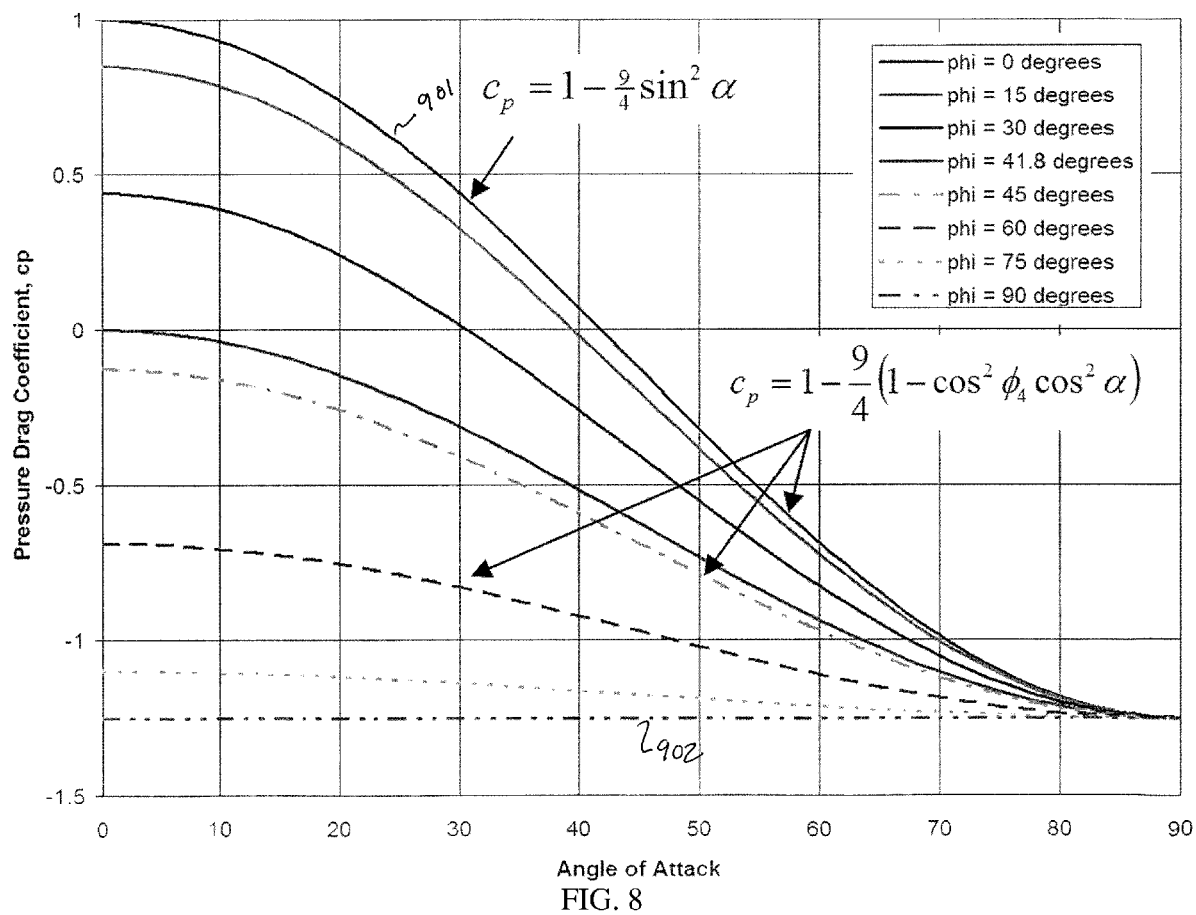
FIG. 8 is a plot of the pressure drag coefficient against the angle of attack for the air probe of the instant invention.

This relation is plotted in FIG. 8. Note that when φ=0° the pressure coefficient reduces to the simpler form, as shown by curve 901. When α=90° the pressure coefficient is constant because the point in question is on the pitch axis, as shown by curve 902.

Experiments confirm that for a cylinder with a spherical tip, the pressure measured on the spherical tip at a port located at point 440 agrees with the preceding equation, namely:

$$c_{p440} = 1 - \frac{9}{4}(1 - \cos^2\alpha\cos^2\phi)$$

The pressure measured on the cylindrical portion near the spherical tip, for example at point 430, follows the relation:

$$c_{p430} = 1 - k\sin^2\alpha$$

Experiments show that the constant k is approximately equal to 1.8 when α is the angle of attack as measured by the sensor. This empirically determined constant corroborates the analytical predication that a long cylinder with a spherical tip has a pressure variation that is more like a sphere (k=2.25) than a cylinder (k=4).

But we also know from the definition of pressure coefficient that:

$$c_{p430} = \frac{P_{430} - SAP}{TAP - SAP}$$

$$c_{p440} = \frac{P_{440} - SAP}{TAP - SAP}$$

Solving for SAP and TAP in terms of the pressure measured at ports 430 and 440 yields:

$$SAP = \frac{c_{p430}P_{440} - c_{p440}P_{430}}{c_{p430} - c_{p440}}$$

$$TAP = \frac{(1 - c_{p440})P_{430} - (1 - c_{p430})P_{440}}{c_{p430} - c_{p440}}$$

In conventional air data systems, the static pressure and total pressure are plumbed to an air data computer, which calculates additional parameters. In the embodiment described herein, these additional parameters can be calculated locally, thus eliminating the air data computer. Once the static air pressure and total air pressure are known, the Mach number (the velocity relative to the speed of sound) can be determined using the equation:

$$M = \sqrt{\frac{2}{\gamma - 1}\left[\left(\frac{TAP}{SAP}\right)^{\frac{\gamma-1}{\gamma}} - 1\right]}$$

where γ=1.4 for air.

The pressure altitude is determined from the static pressure in the conventional method, namely as an exponential function.

The speed of sound and air speed depend upon the temperature of the fluid. Using the total air temperature measured by the resistance temperature detector 480, the static air temperature, speed of sound, and air speed can be calculated.

It should be noted that it is not necessary to locate surface pressure passageway 440 such that the measurement $P_{440}$ equals the free stream static air pressure (SAP) at a zero angle of attack. The sensor uses the angle of attack and pressure coefficient to calculate the proper static air pressure regardless of the initial position of the port. However, there is an advantage to locating this port 440 at an angle of φ=41.4° because the error associated with the calculation is minimal. That is, if the rounded tip surface pressure passageway 440 is located where the pressure drag coefficient is zero, then the static air pressure is known without compensating for position. Further, by locating the pressure port 440 at this specific angle, the measurement of $P_{440}$ is not affected by increasing the speed of the aircraft. Because of this, calculation errors can be minimized.

In an alternate embodiment, the two ports 410 and 420 pneumatically connected to the differential pressure transducer 473 are modified by eliminating port 410 and pneumatically connecting port 420 to an absolute pressure transducer. The advantage of this embodiment is that it eliminates potential sensitivity to moisture inherent in the differential pressure transducer and improves drainage of water from the ports. The angle of attack is still calculated using three independent pressure transducers but only three pressure ports, such that:

$$AOA = f\left(\frac{P_{430} - P_{420}}{P_{430} - P_{440}}\right)$$

Figure 9:
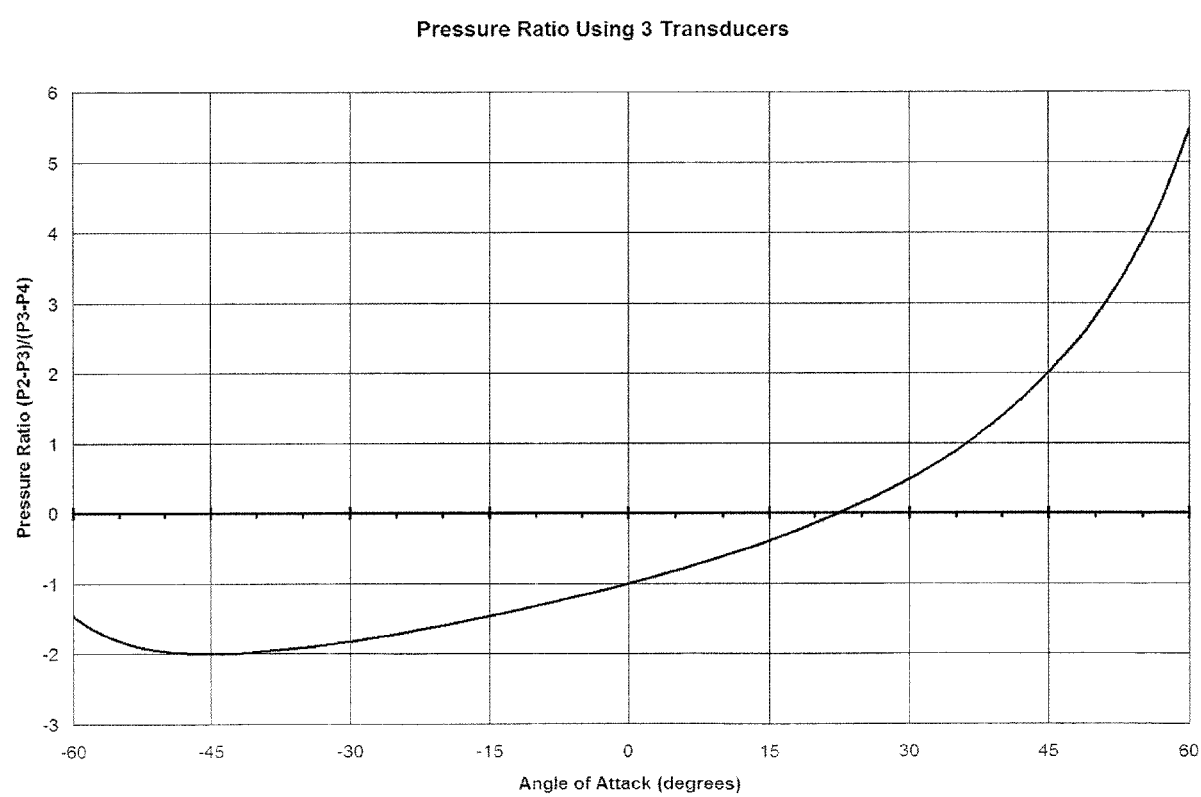
FIG. 9 is a plot of the pressure drag coefficient against the angle of attack using three pressure transducers.
Figure 10:
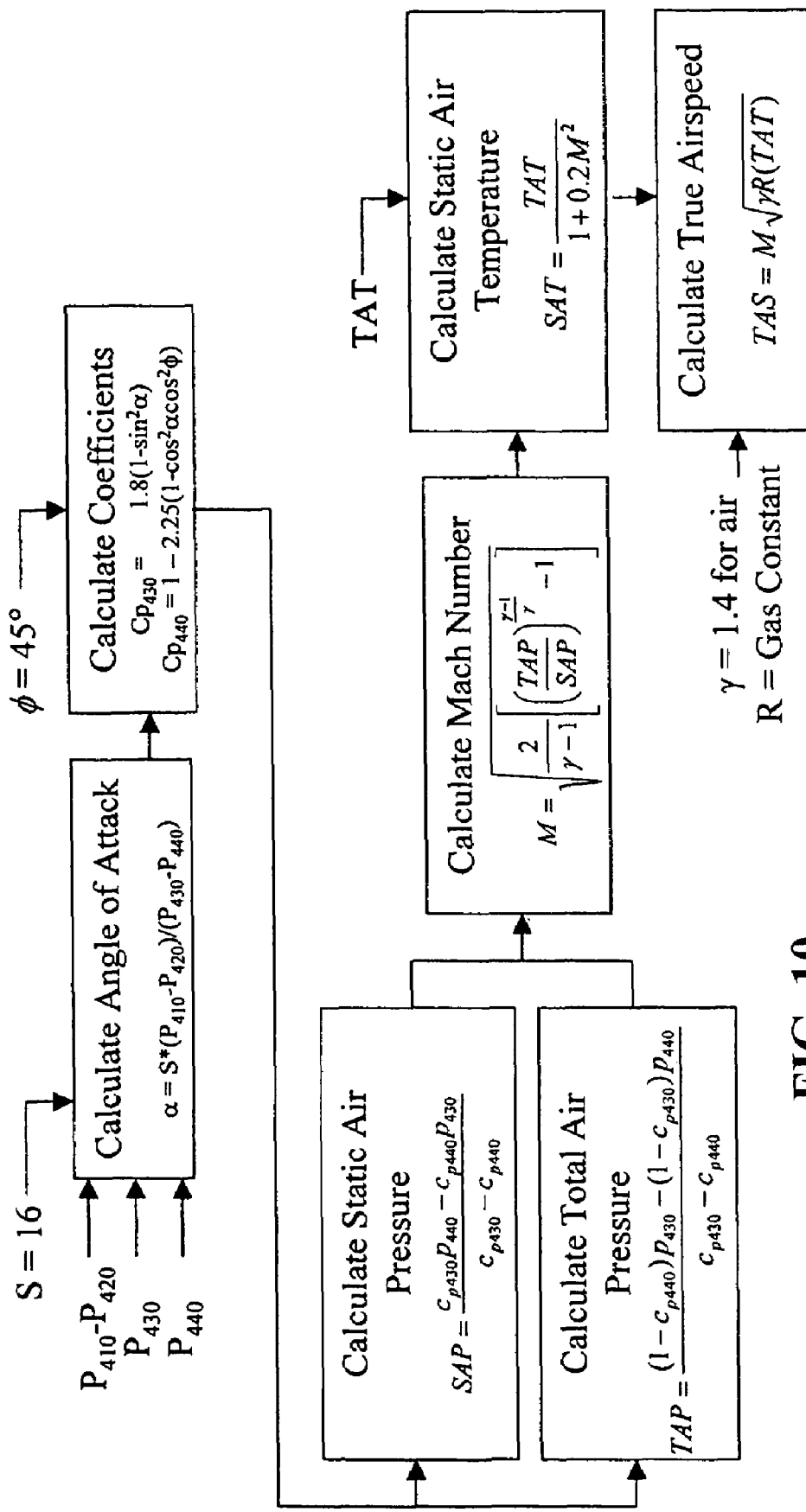
FIG. 10 is a flow chart showing the algorithm the software of the instant invention applies to compute a body's angle of attack, static air pressure, total air pressure, mach number, static air temperature and true air speed using

Although in this alternate embodiment one less pressure port is used, this approach also requires characterizing the non-linear relationship between angle of attack and the pressure ratio. Using the above equations, this non-linear relationship is shown in FIG. 9.

In other embodiments, the RTD 480 is replaced with another commonly available device adapted to measure the temperature of a fluid, or the probe geometry is altered to reduce drag without changing how the air parameters are calculated. The curvature of the rounded tip could also be varied and a new location chosen for the tip pressure passageway 440 such that the measurement $P_{440}$ still equals the static air pressure (SAP) at a zero angle of attack and the pressure drag coefficient is still zero at the rounded tip surface pressure passageway 440. Also, different configurations of pressure transducers could be used, depending on the required set of measurements. The data probe is installed on either side of the fuselage of an aircraft in a redundant configuration and protrudes horizontally into the airflow. If the probe is mounted in the vertical orientation, the Angle of Sideslip (AOS) is measured instead of the Angle of Attack (AOA).

In still other embodiments, the data probe could be used to measure the previously described quantities of fluids other than air. The data probe could be mounted to any object moving through a particular fluid. In certain embodiments, the probe could be mounted to a vehicle other than an aircraft, such as an automobile or watercraft. Further, the data probe could be mounted to any object over which a fluid flows. In one embodiment, the data probe could be used in a lab environment to measure a generated fluid flow.

The various holes on the probe may be either drilled or cast, and the passageways may be rigid or flexible. The materials are not critical to the functionality of the sensor, although steel or aluminum are preferred for strength, lightning protection, and electrical grounding.

In another embodiment, a heater is included within the probe 401 for de-icing and anti-icing purposes. The error introduced by the heater, being a fully characterized function of flow rate and heater power, both of which are known, is compensated by the sensor such that the proper temperature is output regardless whether the heater is energized. The compensation of heater error locally within the sensor is unique and greatly simplifies efforts related to integrating sensors into aircraft. When the sensor detects that the aircraft is in icing conditions, namely at a temperature below freezing and an altitude below 30,000 feet, the heaters automatically energize. Unlike typical air data sensors, the heater is regulated and automatically disabled when the temperature or altitude is above a safe threshold. This regulation of heater power greatly extends the lifetime and reliability of the sensor as it limits the probe temperature to relatively low values. The electronics required to regulate the heater power and subtract the heater error from the temperature signal measured by the resistance temperature detector 480 are enclosed in the same housing 479 as the processor board 514 and power circuit boards 512.

The novel multifunction air data sensor of the present invention has several advantages over prior art probes. The unique probe shape and placement of measurement ports in the data probe 400 provide both ease of manufacture and the efficient conversion of the measurements to outputs using only three pressure transducers. Specifically, the arrangement of ports to read the angle of attack is a significant advantage over prior art data probes. With the addition of the temperature probe, at least four functions of measurement are included in one probe. As a result, the set of measurements is performed at less weight, less cost, and fewer protrusions from the fuselage than prior art measurement devices. Further, the inclusion of sensors allows the probe to export digital (in one embodiment, ARINC 429 serial communication) data rather than multiple analog signals integrated into aircraft instrumentation.

What is claimed is:

1. A multiple function air data sensor for mounting on an aircraft, comprising, in combination:
    an angle of attack sensor;
    a static air pressure sensor;
    a total air pressure sensor;
    a Mach number sensor;
    a static air temperature sensor; and,
    a true air speed sensor, wherein all of the aforesaid sensors are contained in a single housing and supply flight parameter information for the aircraft.

2. The air data sensor of claim 1, further comprising four air passageways connecting a surface of the housing to three pressure transducers contained within the housing.

3. The air data sensor of claim 1, further comprising three air passageways connecting a surface of the housing to three pressure transducers contained within the housing.

4. The air data sensor of claim 1, further comprising at least one airflow passageway connecting a surface of the housing to a temperature sensor contained within the housing.

5. The air data sensor of claim 4, further including one or more air vents for exhausting air from the housing after the air is impinged on the temperature sensor.

6. The air data sensor of claim 4, wherein said temperature sensor comprises a resistance temperature sensor.

7. The air data sensor of claim 1, further including one or more circuit boards including electronics contained within the housing for interpreting data collected from the sensors and converting said data to digital signals.

8. The air data sensor of claim 7, wherein the circuit boards include a power board and a processor board.

9. The air data sensor of claim 7, wherein power and processor electronics are carried on a single board.

10. The air data sensor of claim 7, wherein the one or more circuit boards include Built-in-Test diagnostic circuits.

11. The air data sensor of claim 1, wherein the housing comprises an elongate cylindrical portion, and one or more of the passageways originates on a side surface of the cylindrical portion.

12. The air data sensor of claim 11, wherein the housing includes a rounded tip, and one or more of the passageways originates on a surface of the rounded tip.

13. The air data sensor of claim 1, further comprising a heater contained in the housing for de-icing and anti-icing.

14. A multiple function air data sensor for mounting on an aircraft for supplying information for the aircraft, comprising, in combination:
    an angle of attack sensor:
    a static air pressure sensor:
    a total air pressure sensor:
    a Mach number sensor:
    a static air temperature sensor:
    a true air speed sensor, wherein all of the aforesaid sensors are contained in a single housing:
    a heater contained in the housing for de-icing and anti-icing: and
    a sensor or sensors for detecting when the aircraft is in icing conditions based on temperature and altitude readings, and an electronic circuit for regulating power to the heater based on said readings.

15. The air data sensor of claim 14, further comprising an electronic circuit for regulating power to the heater and for subtracting heater errors from a temperature signal measured by the static air temperature sensor.

16. The air data sensor of claim 14, further comprising four air passageways connecting a surface of the housing to three pressure transducers contained within the housing.

17. The air data sensor of claim 14, further comprising three air passageways connecting a surface of the housing to three pressure transducers contained within the housing.

18. The air data sensor of claim 14, further comprising at least one airflow passageway connecting a surface of the housing to a temperature sensor contained within the housing.

19. The air data sensor of claim 18, further including one or more air vents for exhausting air from the housing after the air is impinged on the temperature sensor.

20. The air data sensor of claim 18, wherein said temperature sensor comprises a resistance temperature sensor.

21. The air data sensor of claim 14, further including one or more circuit boards including electronics contained within the housing for interpreting data collected from the sensors and converting said data to digital signals.

22. The air data sensor of claim 21, wherein the circuit boards include a power board and a processor board.

23. The air data sensor of claim 21, wherein power and processor electronics are carried on a single board.

24. The air data sensor of claim 21, wherein the one or more circuit boards include Built-in-Test diagnostic circuits.

25. The air data sensor of claim 14, wherein the housing comprises an elongate cylindrical portion, and one or more of the passageways originates on a side surface of the cylindrical portion.

26. The air data sensor of claim 21, wherein the housing includes a rounded tip, and one or more of the passageways originates on a surface of the rounded tip.

* * * * *